May 19, 1970  W. B. WEBER ET AL  3,512,736

RADIATIVE HEAT SOURCE AND RE-ENTRY BODY

Filed Oct. 20, 1967  2 Sheets-Sheet 1

INVENTOR.
WILLIAM B. WEBER
ROBERT H. ANDERSON
BY
ATTORNEY

INVENTOR.
WILLIAM B. WEBER
ROBERT H. ANDERSON
BY
*Gerald L. Smith*
ATTORNEY

United States Patent Office 3,512,736
Patented May 19, 1970

3,512,736
RADIATIVE HEAT SOURCE AND RE-ENTRY BODY
William B. Weber, Timonium, and Robert H. Anderson, Baltimore, Md., assignors, by mesne assignments, to Teledyne, Inc., Los Angeles, Calif., a corporation of Delaware
Filed Oct. 20, 1967, Ser. No. 676,852
Int. Cl. B64g 1/00; G21h 1/10
U.S. Cl. 244—1
19 Claims

ABSTRACT OF THE DISCLOSURE

A radioisotopic heat source for use in space traversing vehicles. The source is mounted internally at the center of gravity of a passively stable, self-orienting atmospheric re-entry shield. The shield is shaped having a low ballistic coefficient and formed of a heat conducting material such as graphite. The shield serves the additional function of distributing radioisotopic thermal energy to an array of thermocouples for providing electrical power to the vehicle.

BACKGROUND OF THE INVENTION

Field of the invention

This invention relates to power systems for artificial satellites and the like and more particularly to an isotopic heat source for use in supplying power to such satellites and space traversing vehicles.

Description of the prior art

The advent of highly sophisticated artificial satellites and space traversing vehicles has witnessed a catalysis within the scientific community of efforts for developing a broad spectrum of satellite carried technical missions. This emphasis in exploiting the capabilities of orbiting vehicles and the like has been observed to range from astronomical and biological experimentation to systems of immediate practical utility, as evidenced in communication relay weather data collections and mapping missions.

With each new technical advance and correlative suggestion of further utility for the space vehicles, there is generally introduced a requirement for the launch of more complex, bulksome and heavy mechanisms. Additionally, as satellite functions and their related systems become more complex and costly, practical economic considerations increasingly dictate that the orbiting missions be of relatively longer duration.

The design complexities encountered in accommodating all of the advancing technical desiderata have focused upon the general and practical requirements for highly efficient satellite instrumentational or functional systems having higher power capabilities as well as enhanced reliabilities.

An improvement in any of the satellite functional systems will permit the advantageous maximization of the effective payload capacities of existing launch vehicles.

The effort of developing enhanced system efficiencies has, in particular, delved with concern into the need for improved artificial satellite powering systems. These systems have long introduced design burdens and restrictions resulting from their relatively heavy weight or lower power densities, their relatively bulksome size and shape, presenting undesirably high profile drag areas, and their somewhat limited reliability and effective operational lifespans. It follows that the industry would be most receptive to the development of a power supply of long and reliable lifespan which, additionally, is of relatively low bulk and weight. Ideally, the power supply should be amenable to modular design approaches, thereby facilitating its incorporation within launch systems now in design, production and use. A capability for somewhat immediate insertion within extant launch systems would permit the expansion and extension of missions presently near a completion status without incurring prohibitive redesign and modification costs.

Power systems now considered conventional fail to incorporate all of the desired attributes of low bulk and weight, high power densities, long operational lifespans and requisite reliability. Such drawbacks stem, for the most part, from the inherent physical characteristics of the basic systems. These characteristics are briefly discussed in connection with certain of the more conventional power system concepts in the paragraphs which follow.

Conventional batteries

Almost universally considered in the selection of artificial satellite and space vehicle powering techniques is the battery. These devices, while affording a relatively stable power output, impose an oppressively high weight penalty upon the launch vehicle. This weight factor necessarily must detract from the mass allowance allocated to the instrumentation payload. Further detracting from the use of batteries is their short operational lifespan. The latter disadvantage precludes battery use where a space vehicle is slated to perform terrestrial servicing functions as in communications networks and the like. The coupled characteristics of comparatively higher weight along with a lower operational lifespan serve to minimize any design flexibility which might otherwise be realized from battery systems.

Solar cell panels

Efforts to expand operational lifespans of space devices have also devolved upon the use of solar cells. These devices, operating to photoelectrically convert light energy into electrical energy, are assembled within large planar banks to form panels. The panels, necessarily having relatively large surface or sail areas, are extended in orbit to collect solar radiation. While retaining some advantage of lower weight or higher power density, the solar energized power systems have encountered undesirable operational restrictions. For instance, the individual power cells of the panels have been found to be overly sensitive to various of the solar radiation wave lengths. As a result, the cells are prone to degenerate during use, thereby lowering the operational lifespans and reliability of the panels. Additionally, the build-up of heat within the panels as a result of the impingement of solar radiation has been observed to cause their structural warping which, in turn, tends to destroy the integrity of protective coatings and the like. These coatings would otherwise serve to isolate the photocells from damage.

Solar cell energized power systems are also characterized in requiring means for properly orienting their surfaces with the sun. Generally, this orientation is accomplished by extending a plurality of the solar panels from a satellite, each or pairs of which are positioned to optimize the reception of impinging radiation for a given series of predetermined vehicle orientations. As a consequence of this deployment, the extended panels will function efficiently only during a portion of a flight program. The presence of the relatively extensive sail areas of the panels also is considered undesriable. By necessarily presenting a larger profile area to the direction of satellite orbit, the panels will tend to undesirably contribute to orbital decay.

In applications wherein solar cell power systems are utilized during earth orbit, it is necessary to install a supplemental power supply within space vehicles to accommodate them during their movement within the earth shadow. This accommodation generally is provided by additionally incorporating supplemental batteries within the power system. To promote longer lifespans, the batteries are charged during solar cell activation and load discharge during earth shadow orbit. Unfortunately, this repeated charge and discharge cycling has been found to adversely affect the reliability of the batteries. Of course, the addition of batteries penalizes the weight-load capabilities of a space device.

Inasmuch as solar panels are of large dimension, the storage of their bulk for launching must be reckoned with. Further, in view of the precise orienting required of them during flight, there remain few alternatives to their mode of attachment to a space vehicle.

Radioisotopic power systems

Another approach investigated as a source of operational power for artificial satellites or the like has been that of attaching a radioisotopically heated thermoelectric generator or battery to the devices. In general, the batteries comprise a relatively small quantity of a heat generating radioisotope which serves to heat one end of a number of interconnected thermoelectric elements. The thermoelectric elements, formed of certain semiconductive materials, are joined to form thermocouples, which when heated at a selected end serve to statically generate an electric current. An electrically interconnected array of thermocouples is generally referred to as a thermopile.

In order to function efficiently, the thermocouples must be maintained within a certain ambient environ and must be heated in a manner maintaining a preselected differential of temperature across their individual lengths. The designs for radioisotopically heated thermoelectric units heretofore presented generally have assumed a somewhat cylindrical shape wherein a central radioactive heat producing core is surrounded on as many sides as possible by closely fitted clusters of thermocouples. By so clustering the thermocouple arrays, a degree of maximized consumption of the radioisotope heat energy is thought to be realized. In order to establish and maintain a requisite differential of temperature across the thusly arrayed thermocouples, it is necessary to introduce and interconnect heat conducting and disposing systems from the cold ends of the thermocouples to ambient surroundings. This disposal arrangement is usually provided by somewhat elaborate banks of radiative fins. To further inject a degree of heat instribution control, various forms of insulation are inserted about the thermocouple arrays and a protective inert atmosphere is introduced into portion of the generator housing.

Thusly deployed about the centralized heat source, the assemblage of thermoelements in most instances becomes structurally elaborate, close tolerances and difficulties of installation being the rule rather than the exception. To further add to their bulk and complexity, radiation shielding must also be incorporated within the device housings.

Assembled under the thusly described conventional design approach, the radioisotopic generators have been characterized as bulksome, heavy and intricate, requiring elaborate fin structures for heat dissemination as well as regulated safety procedures for avoiding radiation exposure.

Of course, where space traversing missions utilizing very long vehicles are envisioned, other nuclear power generation techniques utilizing fluid transfer and the like may become practical.

Aerospace nuclear safety

When adapted for attachment to an artificial satellite or space vehicle, the difficulties attendant with utlizing radioisotopic or other nuclear power devices become considerably involved. Three complexities will be immediately apparent to those skilled in ther art, namely, the problem of shielding launch personnel from radiation hazard during and before launching; the protection of contiguous payload instrumentation from radiation damage or interference; and, of considerable importance and difficulty, the disposal of the radioactive products used within space vehicles before or during their re-entry into the earth's atmosphere. The present inveniton is particularly addressed to the latter problem.

When injected into an adequately high orbit, for instance in the order of about 600 nautical miles, a satellite, without being manipulated otherwise, will remain orbited for an extended period of time. Contemporary computation allocates a multi-century orbital life to such altitudes before terrestrial re-entry risks become high. Inasmuch as the half-life characteristics of the radioisotopic fuel will effect a gradual diminution of the intensity of radioactive emission, the risk of unacceptable earth contamination following a multi-century orbit is nominal.

The probabilities for inadequate injection into earth orbit, however, are of such a nature that disposal schemes must be programed into radioisotopically powered satellites. During the recent past, two basic approaches to disposal have been prevalent within the industry. The initial approach has been to provide for destruction of the radioactive source during atmospheric re-entry. Generally, the heat developed during re-entry serves this function. Along with this re-entry burn-up, there is effected a broad dispersal over a portion of the earth of the contaminating radioactive product. Thusly dispersed over a significant oceanic or terrestrial area, it has been earlier considered that the radioactive fallout reaching earth will be of acceptably low levels or intensities. The latter consideration is presently the subject of re-evaluation and as a consequence, such dispersal schemes are not received with favor.

The alternate approach to the problem of disposing of the radioisotopic power sources of satellites is an active one, as opposed to the passive arrangement described above. This technique contemplates a controlled return to earth of the vessel holding the radioactive source and is generally programed either by rendezvous or controlled re-entry schemes. Upon being returned to earth, the radioisotopic source is intact as opposed to being dispersed. This status is now considered desirable. The immense costs associated with either of the active recovery techniques will be immediately apparent.

Where the use of a re-entry vehicle is contemplated, there is involved separate retro power systems, logic control systems, heat shielding and vehicular re-entry orientation devices. Such complex re-entry vehicles must also be fabricated so as to assure reliable operation following an orbit of an extensive period of years. The latter requirement follows from the above-discussed lengthy half-lives of the heat sources currently found acceptable for power generation purposes. For instance, after twenty years of orbit, a conventional fuel will still retain excessive levels of activity. Difficulties are further encountered in providing certain of the materials necessary for the re-entry vehicles. Particularly, the ablative materials developed at present for re-entry heat shielding are not immune from radiation damage or to general environmental degradation where long term exposure is contemplated. As a result, more elaborate and weight contributing structures are necessitated for blocking heat shields and other sensitive equipment from damaging radiation. It follows that the necessarily complex re-entry vehicles will most undesirably detract from any satellite instrumentational payload. Aerospace nuclear safety demands, however, have been seen to insist upon the imposition of this weight penalty in the absence of other and adequate solution.

SUMMARY OF THE INVENTION

From the above review of present day approaches to designs for artificial satellite or space vehicle power supplies, it will be apparent that each fails in one measure or another to provide all of the desired design attributes for a satellite power system. The present invention looks to the promising characteristics of the radioisotopic fueled power system while at the same time proffering solution to an otherwise highly complex requirement for aerospace nuclear safety.

The power system of the invention is characterized in providing an intimately associated fuel source and passively stable self-orienting re-entry structure. This unique combination opens a wide spectrum of technical approaches to the design engineer.

By virtue of the use of the passively stable re-entry structure both for re-entry and as a heat distributing media for a thermopile arrangement or other heat receiving system, the inventive fuel retaining structure is amenable to considerably simplified generator designs.

The inventive thermal energy system advantageously allows for intact recovery of its radioactive fuel by virtue of its stable, self-orienting re-entry characteristic along with its relatively low ballistic coefficient. As a result of its characteristic low ballistic coefficient, the inventive device will readily withstand the shock forces encountered at re-entry earth impact. The ability to so withstand these impact forces permits an intact return to earth of a radioisotopic fuel without requiring elaborate and expensive active recovery schemes.

By virtue of its self orienting status the device of the invention further facilitates tracking procedures or the like which may be necessitated for locating its point earth impact.

It is a further object of the invention to provide a self orienting, passively stable fuel containment and heat distributing device which may be readily incorporated within modular satellite or space vehicle power generation schemes.

Another object of the invention is to provide a recoverable radioisotopically heated thermoelectric generator arrangement for space traversing vehicles which may be utilized for extensive periods of time without imparting radiation damage to its heat shielding members.

These and other objects and advantages of the invention will become apparent from the following detailed description and drawings.

DESCRIPTION OF THE PREFERRED EMBODIMENT

Figure 1:
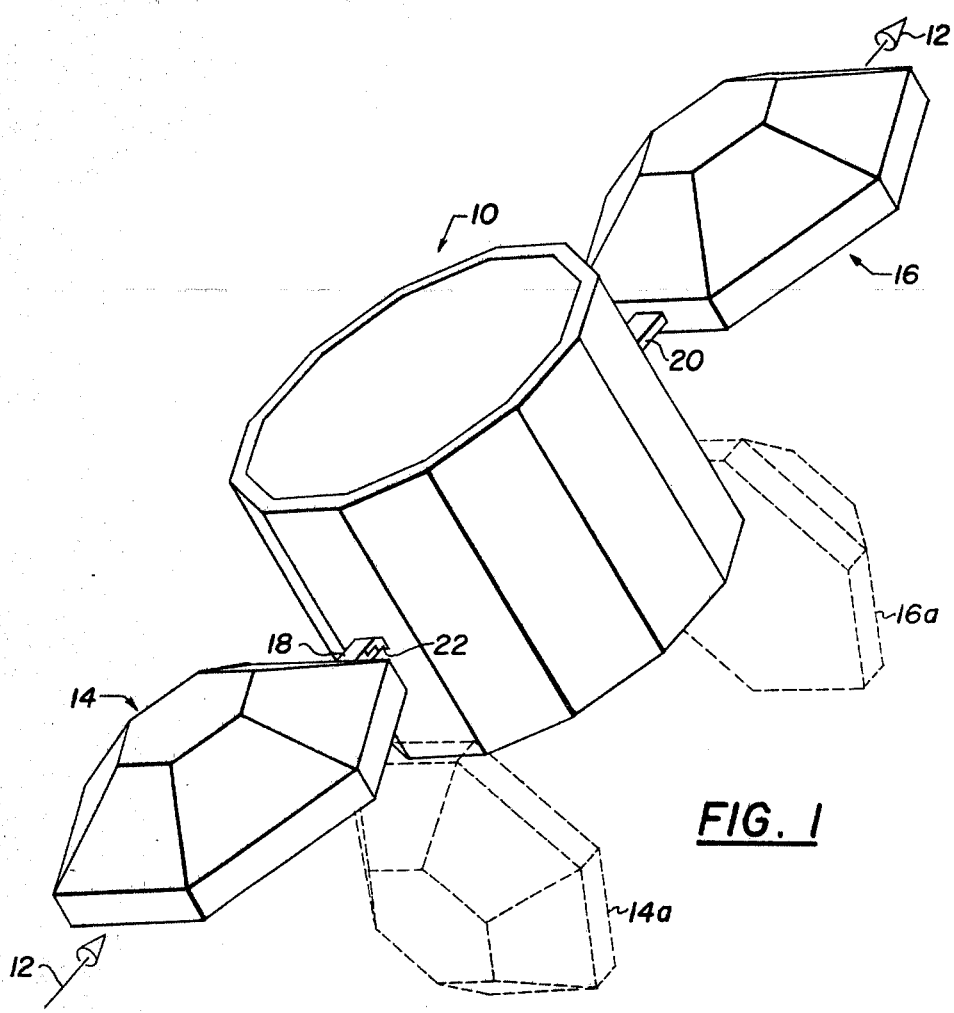
FIG. 1 is a pictoral representation of an artificial satellite showing modular thermoelectric power generators incorporating the fuel containment arrangement of the invention in deployed position and, in phantom, in position for launch stowage.

Looking to FIG. 1, an artificial satellite having a shape which generally may be encountered in the art is shown pictorally at 10. Satellite 10 is illustrated in a launched and orbiting mode, its assumed path or direction of flight being depicted by arrows 12. Depending from the body of the satellite 10 are radioisotopically heated thermoelectric generator panels shown generally at 14 and 16. These panels supply electrical energy to the instrumentation of the satellite.

Generators 14 and 16 are illustrated in their deployed or extended positions for orbit, their extending support being provided by respective arm members 18 and 20. Inasmuch as relatively minor cantilever stresses are imposed upon the supporting arms during gravity-free orbit and since the arms need only additionally serve as a simple conduit for electrical lead attachment with the satellite, their dimension may be small. In order to accommodate the short-lived stresses encountered at launch, however, arms 18 and 20 are generally provided with a form of hinging union. These hinged unions, which are common in the art and consequently not pictured in detail, permit both facile stowage of the panels 14 and 16 within the confines of a rocket vehicle at launch and an adequate diminution of moment stresses otherwise encountered within arms 18 and 20 by virtue of their cantilever structure. An illustrative positioning of the panels at launch is shown in phantom in the figure where the stowed orientation of panel 14 is shown at 14a and a stowed orientation of panel 16 is shown at 16a. Inasmuch as the panels are positioned when the vehicle is within a weightless environ, only a small amount of positioning force is required. Of course, springs or electromotive devices have also been found adaptable to the panel positioning function. Situated at any convenient location upon the arms 18 and 20 is a separable union 22, serving through the use of explosive bolts 24 to provide for ejectment of the panels 14 and 16. Such features constitute a design option but serve to highlight a basic advantage of the present power system. During orbtal decay, the ejected panels will passively stabilize and in and of themselves return their radioisotopic power source to earth in an intact status.

Also to be evidenced from the figure is the relatively small size or bulk of the generator panels 14 and 16. By virtue of this advantageous dimension and the above discussed mode of attachment to the vehicle 10, the profile drag area as observed along the flight path direction is minimized. As a result, satellites employing the instant powering arrangement will enjoy a lengthier freedom from orbital decay. The advantageous shape and relative dimension of panels 14 and 16 may also serve the general purpose of affording an improved stabilization for the vehicle to which they are attached.

Figure 2:
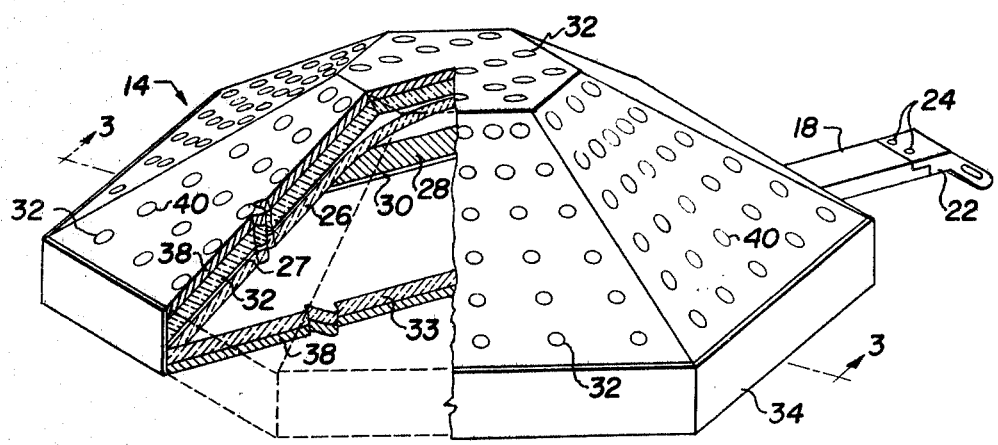
FIG. 2 is a perspective view of a power generator of FIG. 1 with portions cut away to reveal internal structure.
Figure 3:
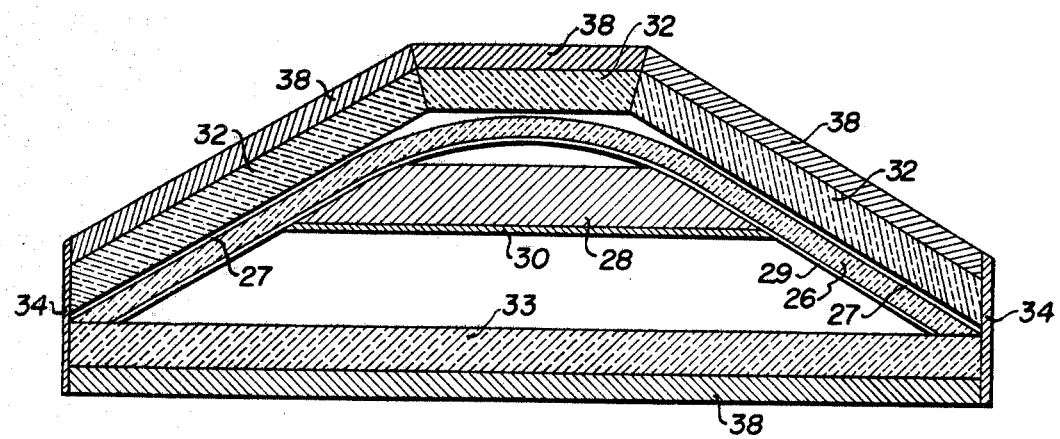
FIG. 3 is a sectional view of the generator panel taken along the plane of line 3—3 in FIG. 2.

Turning to FIGS. 2 and 3, the general structure of the generator panel is more elaborately portrayed. The basic element of the generator is a heat producing shell structure. This structure is fashioned of a thermally conductive shell 26 within whose concavity is intimately connected a radioisotopic heat source 28. The shell 26 is structured having a shape which is passively or inherently stable and oriented during free fall through the earth's atmosphere. Shell 26 is also shaped such that when moving with the heat source 28 through the atmosphere, it will enjoy a low ballistic coefficient. The combination of these attributes will be seen to eliminate the need for ablative re-entry heat shielding schemes to effect intact heat source recovery. While the source 28 may be formed of a suitable isotopic fuel such as Sr-90, Pu-238 or the like, the shell 26 to which it is thermally bonded is fashioned of a material which will thermally conduct and distribute the thermal energy of the source. Typical of such suitable materials are graphite or reinforced hot-pressed boron nitride. Numerous modes of attachment of source 28 to shell 26 will occur to those skilled in the art. For example, the inward surface of shell 26 may be metallically flame sprayed to form a layer 29 following which the source 28 may be intermetallically bonded thereto, or a retaining plate as at 30 may be attached to the shell and source.

Disposed adjacent the outward surface and across the under side of the shell 26 are a plurality of modular thermopiles 32 and 33. The thermopiles 32 may be fixed in position by a conventional framing unit (not shown) along with a peripheral tension strap as at 34. Such a framing structure holds the thermopiles 32 in position somewhat adjacent to shell 26 so as to permit the transference of thermal energy therebetween. A small gap as shown at 27 may be interposed at the thermopile-shell interface to encourage a more uniform heat input into the thermopile structure. Of course, thermopile units 33 disposed across the bottom or open portion of shell 26 will receive thermal energy through the radiant effect induced by the combined inner surface of shell 26 and the heat source 28.

The thermopile units 32 are depicted only generally as layers in the figures and will be seen to comprise an array or network of interconnected thermoelectric elements. Each of the thermopile units is connected at its outwardly disposed face to a planar radiating surface shown at 38. Connection will be seen to be effected by countersunk nuts or the like shown typically at 40 which are distributed in spaced relationship over the outward faces of the radiating surface 38.

Figure 4:
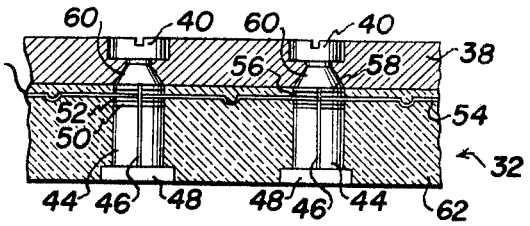
FIG. 4 is a sectional view of a portion of a thermopile as may be utilized with the invention.

Looking to FIG. 4, a portion of a thermopile as may be utilized in connection with the invention is illustrated. The thermopile structures 33 and 34 are formed of an array of spaced thermocouples as shown at 44. Thermocouples 44 may be fabricated in numerous shapes and sizes, however, for the present illustration, they are shown having P and N elements of half-cylinder shape. The half cylinders of each couple are separated longitudinally by strips of insulating material 46 and are bonded to hot shoes or hot side collectors 48. The latter are disposed to receive heat emanating from shell 26 across gap 27 or in the cases of thermopile 33 by radiant transfer across the depth of the shell. Typically, the cold sides of the thermoelectric elements are provided with half circular bonded cold shoes 50, to which are, in turn, bonded in layered fashion conductive half circular stress compensation wafers 52, thence the assembly is bonded to electrical connector straps 54. The straps 54 are conventionally fashioned from copper and serve to electrically interconnect the thermocouple outputs in series, parallel or combinations thereof. Above the connector straps 54 there are bonded electrically insulating wafers 56, on top of which may be bonded a second stress compensating wafer 58. Each of the wafers and connectors bonded upon the cold sides of the thermoelectric elements is selected having relatively high thermal conductivity so as to permit the facile passage of heat into radiators 38. Where the wafers must be electrically insulative but thermally conductive, the metal wafers may be flame sprayed with an insulative oxide coating. Connection into the radiators is effected by bonding the upper portion of the thermocouples to conically shaped stud attachments 60. Threaded at their apex, the metal studs serve to provide both thermal conduction for heat dumping purposes, as well as to retain the thermopile assemblies in appropriate position. The studs are held in place within the counterbores in the radiators by virtue of a threaded connection with nuts 40.

To provide an enhanced temperature distribution within the thermopiles, it may be found advantages to form the entire array of thermocouples within an insulating medium such as that indicated at 62. A rigid-foamaceous product often utilized for this purpose is a product having the brand name Min-K manufactured by the Johns-Manville Corporation of Manville, N.J. To further enhance thermal control within the generators, the material selected for fabricating the radiators 38 should retain a relatively high thermal conductivity and sufficient strength. Beryllium and similar materials will be found adequate for the purpose. The selection of thermoelectric materials for incorporation within the thermopiles will be determined from a number of design parameters including their design temperature of operation and optimum form of operating environment. It may be desirable to select a particular thermocouple material to correspond with the temperature prevalent at a given location about the generator panel structure.

From the foregoing structural description it will be evident that the shell structure 26 serves a number of functions. While acting as a support for the radiation source, the shell further serves the function of distributing thermal energy in somewhat uniform fashion across the thermopiles 32 and 33. During the progress of re-entering the atmosphere, the thermopiles and other contiguous structure will be burned away leaving merely the shell 26 and source 28. At this time the shell serves a third purpose of providing an oriented re-entry of such low velocity as to prevent further burn-up and permit an earth impact of a nature maintaining the source 28 in an intact status. It will be apparent that the number, shape and disposition of the individual thermopile panels may be altered to suit design choice. Additionally, design variations are available for the shell members 26 and the mode of attachment of the heat source 28.

Figure 5:
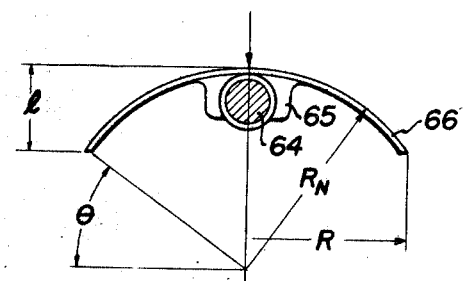
FIG. 5 is a sectional contour of a shell member as may be used with the present invention.
Figure 6:
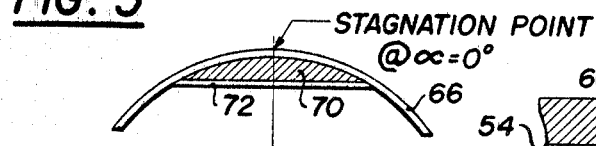
FIG. 6 is a sectional contour of a shell member as may be used with the present invention showing an alternate fuel loading arrangement.

Looking to FIGS. 5 to 8, exemplary variations of the shell configurations are presented. The shell structures must be designed so as to be passively stable and self-orienting during free-fall through the atmosphere. This means that the aerodynamic characteristic of the body is such that the normal disturbances experienced during re-entry will cause the body to prefer one orientation, which may be oscillatory in nature, over all others. This orientation results from the shape of the body itself without the use of aerodynamic control surfaces, reaction jets, etc. These structures should further retain a shape adequate to receive, retain and protect the heat source or fuel during re-entry. Additionally, the shells must be configured having a low ballistic coefficient so as to control re-entry or aerodynamic heating and effect a relatively low terminal velocity, for instance, of about 100 ft./ second. A high drag ballistic coefficient in the range of about 10 to 20 will generally be found adequate for this purpose. In FIGS. 5 and 6, a spherical segment is pictured having symbolic dimensions wherein $R_N$ is the nose radius and characteristic aerodynamic heating radius; R is the radius of the segment's base; $l$ is the length of body of the segment; $\theta$ is the spherical segment's half angle; and $\alpha$ is the angle of attack or angular displacement between the velocity vector of the shell and the longitudinal or $x$ axis. In establishing dimensioning for the spherical segment, those conversant in the aerodynamic art will recognize that as the ratio $R/R_N$ decreases there will be effected a corresponding increase in stability, drag and aerodynamic heating. It has been determined that desirable aerothermodynamic performance can be effected utilizing state-of-the-art materials when the $R/R_N$ ratio is from 0.5 to 1.0.

For exemplary purposes, a spherical segments may be selected having an $R/R_N$ ratio of 0.8; an $l/R_N$ ratio of 0.4; $\theta=37°$ to evolve a drag coefficient $C_D$ of 1.26 at $\alpha=0°$ and a stability ratio, $x_{cp}/l$, of 2.5 where $x_{cp}$ is the center of pressure location measured positively aft of the segment's stagnation point. It is, of course, desirable to mount the heat source as far forward into the shell or near its center of gravity as possible. In FIG. 5, a configuration for mounting a spherical heat source 64 within a bracket 65 attached to shell 66 is depicted. Another heat source mounting within a spherical segment 68 is shown at 70 in FIG. 6. In this arrangement, a simple annular bracket 72 retains the source 70 in place.

Figure 7:
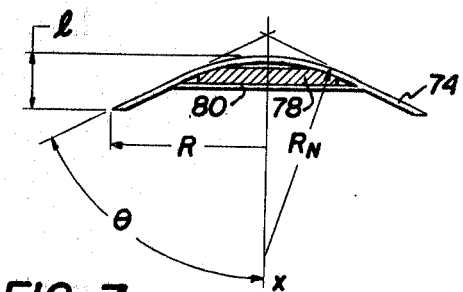
FIG. 7 is a sectional contour of a shell member as may be used with the present invention.
Figure 8:
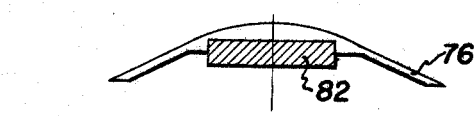
FIG. 8 is a sectional contour of a shell member as may be used with the present invention showing an alternate fuel loading arrangement.

Turning to FIGS. 7 and 8, a second exemplary variation for the shell configuration is presented. The shape pictured at 74 and 76 is generally referred to as a "blunt cone." Similar to the spherical segment blunt cone segment 74 is symbolically dimensioned having an aerodynamically heating radius $R_N$, a radius of the segment R, a half cone angle $\theta$ and a body length. Aerodynamicists will recognize that as the value of $R/R_N$ decreases, the stability, drag and aerodynamic heating values will correspondingly rise. Also, as the angle $\theta$ is increased, so also will drag and stability factors increase. The blunt cone shape 74, heat source 78 and bracket 80 will be recognized as that earlier described in connection with FIGS. 2 and 3. The blunt cone shell 76 of FIG. 8 will be seen to be molded or shaped to receive a right cylindrically shaped heat source 82 as an example of the many radioisotopic heat source mounting variations available to the designer. As in the case of the spherical segment discussed above, the blunt cone design may typically be designed having an $R/R_N$ value of 0.8 to evolve an $I/R_N$ ratio of 0.27, where $\theta=65°$, to derive a drag coefficient of 1.53 at $\alpha=0°$ and a stability ratio, $x_{cp}/l$, at $\alpha=0°$ of 7.4.

The power generation arrangement described hereinabove has been pointed out to enjoy numerous advantages over conventional systems. Heat dumping of thermal energy passing through the thermopiles is greatly simplified inasmuch as the entire generator structure is positioned away from the space vehicle body. In addition to this desirable orientation, the generators provide for passive, oriented, intact re-entry.

Of considerable advantage, the oriented status of the shell structure at earth impact allows the designer to configure the radioisotope containment device to survive impact. The probabilities for such intact survival are greatly enhanced because of this prior knowledge. Further, the heat source-shell structure may be used in a variety of power generation schemes other than those utilizing radioisotopes.

It will be apparent to those skilled in the thermoelectric and satellite design arts that many variations may be made in the detailed disclosure set out herein for illustrative purposes, without departing from the spirit or scope of the invention.

We claim:

1. A heat source for use within power generators for space traversing vehicles comprising:
   (a) a thermally conductive, convexly formed re-entry shell configured so as to remain passively stable during free-fall through the earth's atmosphere;
   (b) a radioisotopic fuel disposed within said shell at a position substantially near the center of gravity thereof; and
   (c) means for connecting said radioisotopic fuel and said shell in a manner providing thermal energy transfer therebetween.

2. The heat source of claim 1 wherein said shell is configured having a ballistic coefficient of value permitting its re-entry into the earth's atmosphere at substantially low thermal velocities.

3. The heat source of claim 2 wherein said value of ballistic coefficient lies between about 8 and 20.

4. The heat source of claim 1 wherein said shell is configured as a segment of a sphere.

5. The heat source of claim 1 wherein said shell is configured as a segment of a cone.

6. The heat source of claim 1 wherein said shell is configured at a segment of a truncated cone.

7. The heat source of claim 1 wherein said shell is formed of graphite.

8. The heat source of claim 1 wherein said shell is formed from hot pressed boron nitride.

9. The heat source of claim 1 wherein:
   (a) said shell is coinfigured having a ballistic coefficient less than 20; and
   (b) said shell is configured as a segment of a sphere.

10. The heat source of claim 1 wherein:
    (a) said shell is configured having a ballistic coefficient less than 20; and
    (b) said shell is configured as a segment of a cone.

11. The heat source of claim 10 wherein said shell is configured as a right truncated cone.

12. A power supply for a space traversing vehicle comprising:
    (a) a thermally conductive, convexly formed re-entry shell coinfigured so as to remain passively stable during free-fall through the earth's atmosphere;
    (b) a radioisoptopic fuel disposed within said shell at a position substantially near the center of gravity thereof;
    (c) connector means for fixing said fuel so said shell in a manner providing thermal energy transfer therebetween;
    (d) at least one thermopile having a heat collecting surface disposed adjacent the outward surface of said shell in a manner permitting heat transfer therebetween;
    (e) frame means disposed about said shell and said at least one thermopile and adapted to support said thermopile heat collecting surface in spaced relation from said shell surface;
    (f) heat-dumping means in connection with said thermopile for disposing of thermal energy passing therethrough and establishing a differential of temperature thereacross; and
    (g) circuit means interconnecting said at least one thermopile and said vehicle.

13. The power supply of claim 12 in which said re-entry shell is configured so as to have a ballistic coefficient less than 20.

14. The power supply of claim 12 in which said re-entry shell is configured as a segment of a sphere.

15. The power supply of claim 12 in which said re-entry shell is configured as a segment of a right cone.

16. The power supply of claim 12 in which said re-entry shell is fabricated from graphite.

17. The power supply of claim 12 in which said re-entry shell is fabricated from hot pressed boron nitride.

18. The power supply of claim 12 including deploying means in connection between said space vehicle and said frame means for effecting the flight positioning of said power supply.

19. The power supply of claim 18 in which said deploying means are dimensioned so as to burn away at a substantially high rate during the re-entry of the said vehicle into earth atmosphere so as to effect a separation of said vehicle and said power supply.

References Cited

UNITED STATES PATENTS 3,286,951  11/1968  Kendall _____ 244—1

RODNEY D. BENNETT, JR., Primary Examiner

C. L. WHITHAM, Assistant Examiner

U.S. Cl. X.R.

136—202; 244—113